United States Patent
Binek et al.

(10) Patent No.: US 12,188,416 B2
(45) Date of Patent: Jan. 7, 2025

(54) GAS TURBINE ENGINE WITH INTEGRAL ACTUATION SYSTEM

(71) Applicant: Raytheon Technologies Corporation, Farmington, CT (US)

(72) Inventors: Lawrence A. Binek, Glastonbury, CT (US); Sean R. Jackson, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/902,307

(22) Filed: Sep. 2, 2022

(65) Prior Publication Data
US 2024/0077030 A1 Mar. 7, 2024

(51) Int. Cl.
*F02C 7/264* (2006.01)
*F02C 9/16* (2006.01)

(52) U.S. Cl.
CPC ............... *F02C 7/264* (2013.01); *F02C 9/16* (2013.01)

(58) Field of Classification Search
CPC .. F02C 7/26; F02C 7/264; F23D 11/42; F23Q 9/00; F23C 2700/063; F02P 21/00; F02K 9/44; B64D 37/12; B64D 37/02
See application file for complete search history.

(56) References Cited

U.S. PATENT DOCUMENTS

| | | | |
|---|---|---|---|
| 2,411,552 A | 11/1946 | New | |
| 2,979,896 A | 4/1961 | Perkins, Jr. | |
| 5,373,698 A * | 12/1994 | Taylor | F02C 1/10 60/671 |
| 5,787,563 A * | 8/1998 | Jenkins | F17C 5/06 53/97 |
| 5,794,435 A * | 8/1998 | Jones | F02K 9/50 60/260 |
| 5,913,807 A * | 6/1999 | Bak | F02C 7/272 60/734 |
| 9,086,033 B2 | 7/2015 | Dushku | |
| 10,837,364 B2 * | 11/2020 | Roberge | F01D 5/288 |

(Continued)

FOREIGN PATENT DOCUMENTS

GB 812806 A 4/1959

OTHER PUBLICATIONS

EP Search Report for EP Patent Application No. 23195225.0 dated Apr. 22, 2024.

*Primary Examiner* — Ehud Gartenberg
*Assistant Examiner* — Jacek Lisowski
(74) *Attorney, Agent, or Firm* — Getz Balich LLC

(57) ABSTRACT

An engine system is provided that includes a gas turbine engine and an actuation system. The gas turbine engine includes a compressor section, a combustor section, a turbine section and a flowpath extending through the compressor section, the combustor section and the turbine section. The actuation system includes a fluid reservoir, a flow regulator and a flow circuit. The flow regulator is configured as or otherwise includes a barrier between the fluid reservoir and the flow circuit. The flow regulator is configured to fluidly decouple the fluid reservoir from the flow circuit when the barrier is intact. The flow regulator is configured to fluidly couple the fluid reservoir with the flow circuit when the barrier breaks. The flow circuit is configured to direct gas from the fluid reservoir into the flowpath when the barrier breaks.

14 Claims, 6 Drawing Sheets

(56) References Cited

U.S. PATENT DOCUMENTS

| | | | |
|---|---|---|---|
| 11,326,556 B2 | 5/2022 | Summers | |
| 2003/0080242 A1* | 5/2003 | Kawai | B64C 11/001 244/12.4 |
| 2017/0187020 A1* | 6/2017 | Yeh | F16K 17/403 |
| 2020/0263796 A1* | 8/2020 | Veto | F16K 31/1266 |
| 2021/0088217 A1* | 3/2021 | Binek | F23R 3/16 |
| 2022/0024576 A1* | 1/2022 | Witt | B64D 37/04 |

* cited by examiner

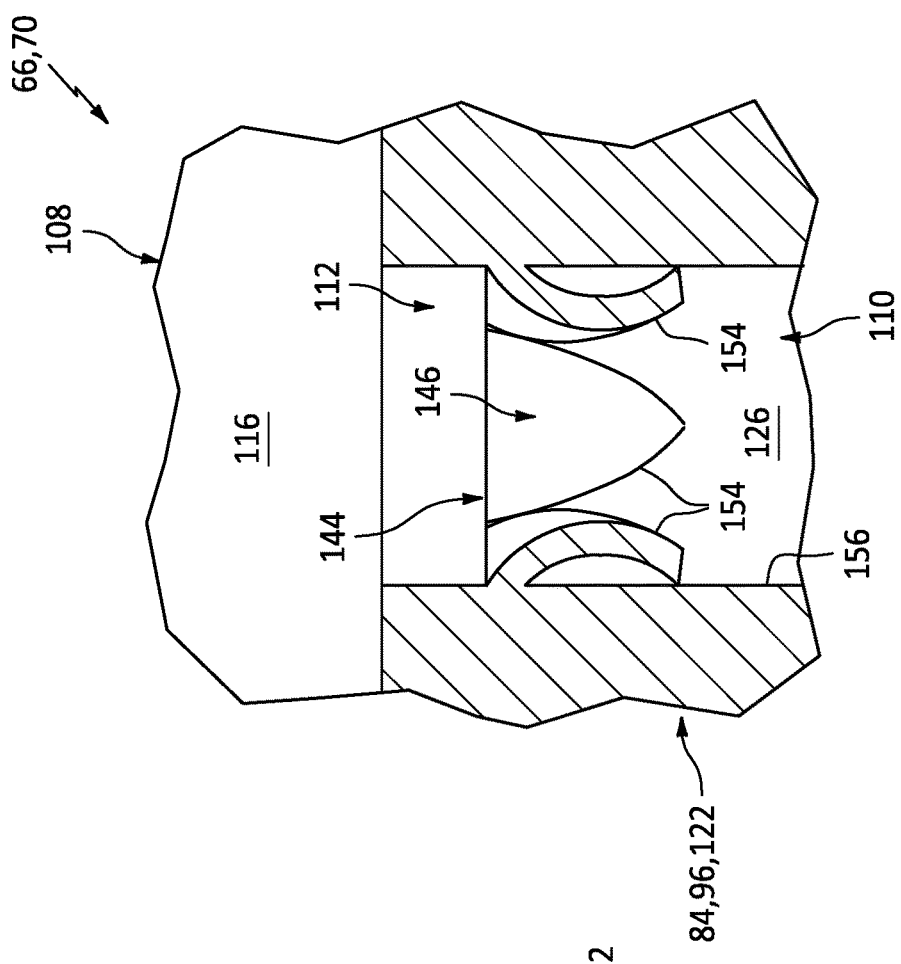
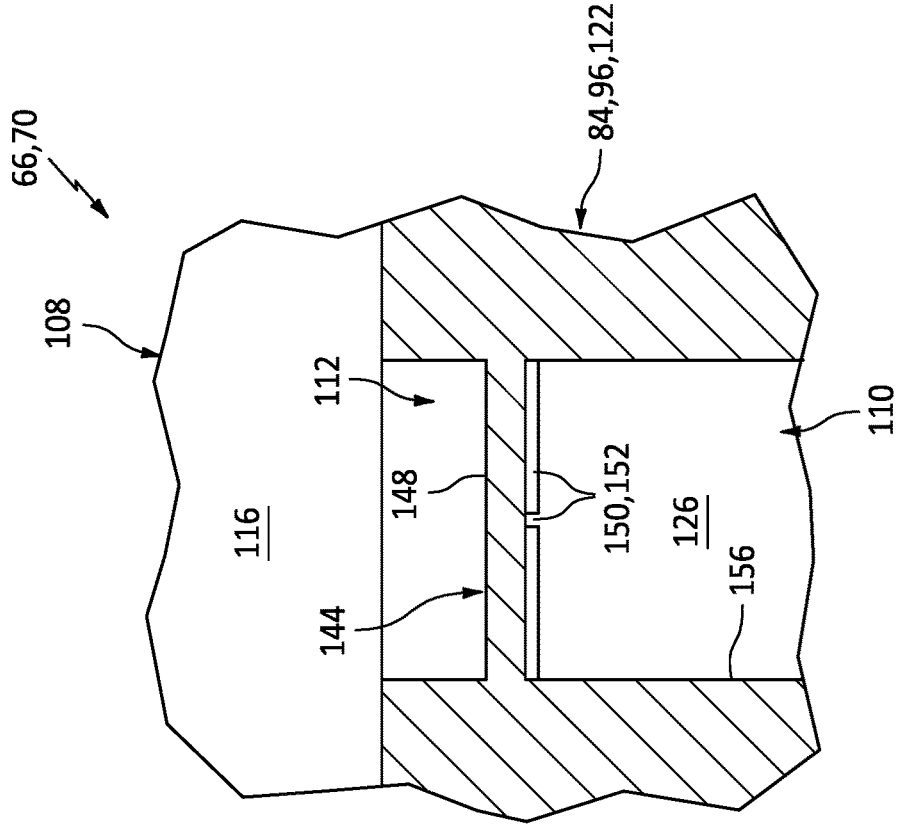

GAS TURBINE ENGINE WITH INTEGRAL ACTUATION SYSTEM

BACKGROUND OF THE DISCLOSURE

1. Technical Field

This disclosure relates generally to a gas turbine engine and, more particularly, to a system for actuating the gas turbine engine during, for example, engine startup.

2. Background Information

A gas turbine engine may be configured with an actuation system such as a starter system. The starter system may drive rotation of a spool within the gas turbine engine to provide compressed air for combustion within a combustor of the gas turbine engine. Various types and configurations of starter systems are known in the art. While these known starter systems have various benefits, there is still room in the art for improvement.

SUMMARY OF THE DISCLOSURE

According to an aspect of the present disclosure, an engine system is provided that includes a gas turbine engine and an actuation system. The gas turbine engine includes a compressor section, a combustor section, a turbine section and a flowpath extending through the compressor section, the combustor section and the turbine section. The actuation system includes a fluid reservoir, a flow regulator and a flow circuit. The flow regulator is configured as or otherwise includes a barrier between the fluid reservoir and the flow circuit. The flow regulator is configured to fluidly decouple the fluid reservoir from the flow circuit when the barrier is intact. The flow regulator is configured to fluidly couple the fluid reservoir with the flow circuit when the barrier breaks. The flow circuit is configured to direct gas from the fluid reservoir into the flowpath when the barrier breaks.

According to another aspect of the present disclosure, another engine system is provided that includes a gas turbine engine, a fluid reservoir for the gas turbine engine, and a burst plate integral with a sidewall of the fluid reservoir. The burst plate is configured as or otherwise includes a passage barrier with one or more stress concentrators.

According to still another aspect of the present disclosure, another engine system is provided that includes a gas turbine engine and an actuation system. The gas turbine engine includes a nozzle, a compressor section, a combustor section, a turbine section and a flowpath extending through the compressor section, the combustor section and the turbine section. The nozzle includes a plurality of vanes. The actuation system includes a fluid reservoir, a flow regulator and a flow circuit. The flow circuit is configured to fluidly couple the fluid reservoir to the core flowpath within the turbine section though the flow regulator. The flow circuit includes a passage formed by and extending within a first of the vanes.

The nozzle may be configured as or otherwise include a diffuser nozzle between the compressor section and a combustor within the combustor section.

The flow regulator may be configured as or otherwise include a burst plate between the fluid reservoir and the flow circuit.

The barrier may be configured to burst open without liberating debris into the flow circuit when the barrier breaks.

The barrier may be configured as or otherwise include a wall with a stress concentrator.

The stress concentrator may be configured as or otherwise include a groove.

The wall may also include a second stress concentrator that intersects the stress concentrator.

The barrier may be integral with a wall of the fluid reservoir.

The flow circuit may be configured to direct the gas into the flowpath within the turbine section when the barrier breaks.

The gas turbine engine may also include a turbine rotor within the turbine section. The flow circuit may be configured to direct the gas into the flowpath to drive rotation of the turbine rotor when the barrier breaks.

The flow circuit may include a base passage, a first branch passage and a second branch passage. The first branch passage may extend out from the base passage to a first outlet along the flowpath. The second branch passage may extend out from the base passage to a second outlet along the flowpath.

A length of the first branch passage may be equal to a length of the second branch passage.

The first outlet and the second outlet may be aligned longitudinally along the flowpath.

The gas turbine engine may also include a plurality of vanes arranged in an array and extending across the flowpath. The flow circuit may extend through a first of the vanes.

The gas turbine engine may also include a wall forming a peripheral boundary of the flowpath. The flow circuit may extend circumferentially about a centerline of the gas turbine engine within the wall.

The gas turbine engine may include a stationary structure and a rotating structure at least partially housed within the stationary structure. The reservoir and the stationary structure may be included in a monolithic body.

The flow circuit may include a passage formed by and within the monolithic body.

The engine system may also include an ignitor configured to ignite fuel within the fluid reservoir to provide the gas.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5A and 5B are side sectional illustrations of a portion of an actuation system with the flow regulator in closed and open arrangements.

DETAILED DESCRIPTION

Figure 1:
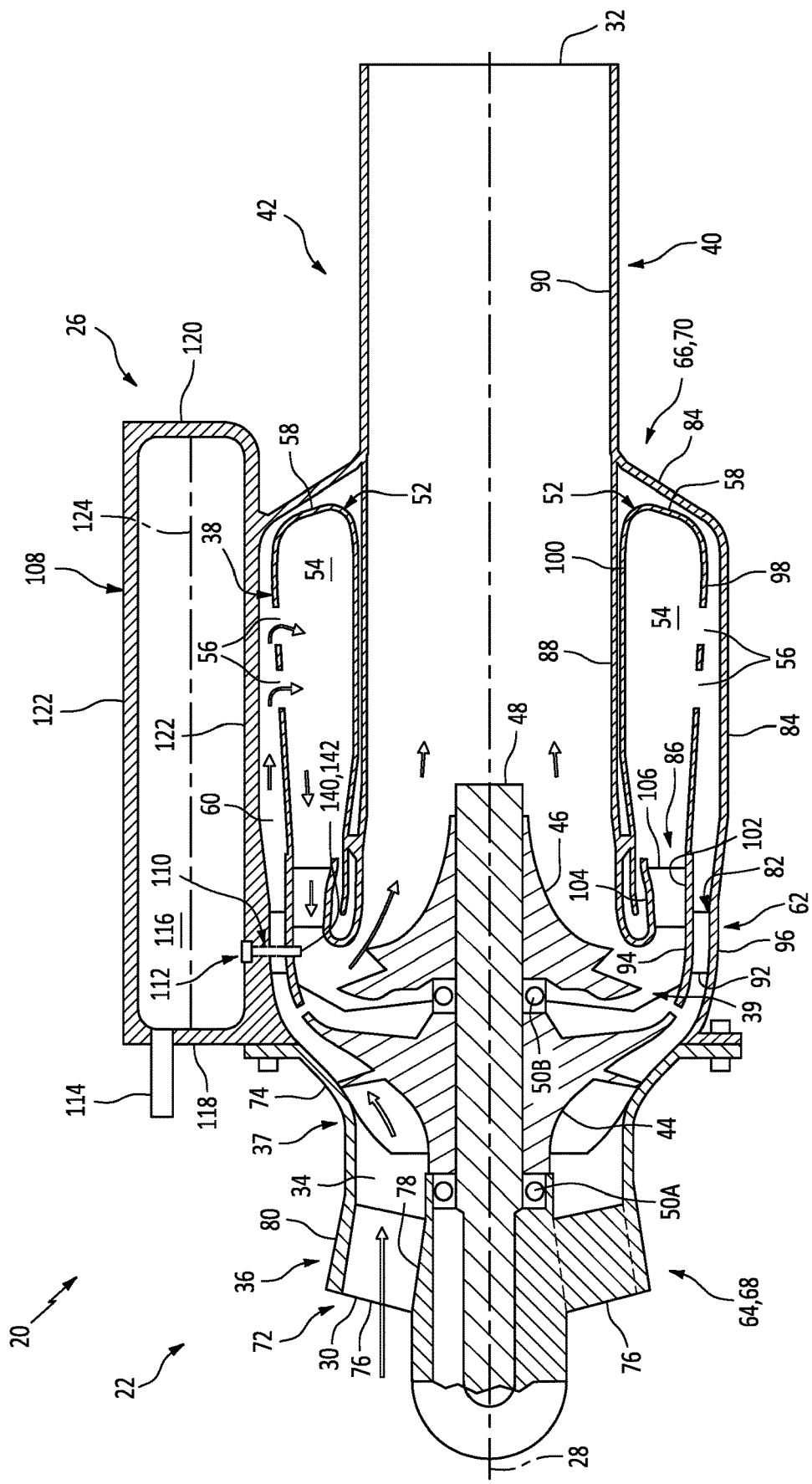
FIG. 1 is a partial side sectional illustration of an engine system.

FIG. 1 illustrates an engine system 20 for an aerial vehicle such as, but not limited to, an unmanned aerial vehicle (UAV), a drone or any other manned or unmanned aircraft or self-propelled projectile. The engine system 20 of FIG. 1 includes a gas turbine engine 22 and a system 26 for actuating (e.g., a starting) operation of the gas turbine engine.

The gas turbine engine 22 of FIG. 1 is configured as a single spool, radial-flow turbojet gas turbine engine. This gas turbine engine 22 is configured for propelling the aerial vehicle. The present disclosure, however, is not limited to such an exemplary turbojet gas turbine engine configuration nor to a vehicle propulsion system application. For example, the gas turbine engine 22 may alternatively be configured as an auxiliary power unit (APU) for the aerial vehicle.

The gas turbine engine 22 of FIG. 1 extends axially along an axial centerline 28 between a forward, upstream airflow inlet 30 into the gas turbine engine 22 and an aft, downstream exhaust 32 out of the gas turbine engine 22. This axial centerline 28 may be a centerline axis of the gas turbine engine 22. The axial centerline 28 may also or alternatively be a rotational axis for one or more components within the gas turbine engine 22.

The gas turbine engine 22 includes a core flowpath 34, an inlet section 36, a (e.g., radial flow) compressor section 37, a (e.g., reverse flow) combustor section 38, a (e.g., radial flow) turbine section 39 and an exhaust section 40. The gas turbine engine 22 also includes a static engine structure 42 housing and/or forming one or more or all of the engine section 36-40.

The core flowpath 34 extends within the gas turbine engine 22 between the engine inlet 30 and the engine exhaust 32. More particularly, the core flowpath 34 extends sequentially through the inlet section 36, the compressor section 37, the combustor section 38, the turbine section 39 and the exhaust section 40 from the engine inlet 30 to the engine exhaust 32.

The compressor section 37 includes a bladed compressor rotor 44. The turbine section 39 includes a bladed turbine rotor 46. Each of these engine rotors 44, 46 includes a plurality of rotor blades arranged circumferentially around and connected to at least one respective rotor disk and/or hub. The rotor blades, for example, may be formed integral with or mechanically fastened, welded, brazed, adhered and/or otherwise attached to the respective rotor disk(s) and/or hub(s).

The compressor rotor 44 may be configured as a radial flow compressor rotor.

The turbine rotor 46 may be configured as a radial flow turbine rotor. The compressor rotor 44 is connected to the turbine rotor 46 through an engine shaft 48, where at least (or only) the engine components 44, 46 and 48 form an engine rotating structure; e.g., a spool. This rotating structure and its engine shaft 48 are rotatably supported by the static engine structure 42 through a plurality of bearings 50A and 50B (generally referred to as 50); e.g., rolling element bearings, journal bearings, etc.

The combustor section 38 includes an annular combustor 52 with an annular combustion chamber 54. The combustor 52 of FIG. 1 is configured as a reverse flow combustor. Inlets ports 56/flow tubes into the combustion chamber 54, for example, may be arranged at (e.g., on, adjacent or proximate) and/or towards an aft bulkhead wall 58 of the combustor 52. An outlet from the combustor 52 may be arranged axially aft of an inlet to the turbine section 39. The combustor 52 may also be arranged radially outboard of and/or axially overlap at least a (e.g., aft) portion of the turbine section 39. With this arrangement, the core flowpath 34 of FIG. 1 reverses direction (e.g., from a forward-to-aft direction to an aft-to-forward direction) a first time as the core flowpath 34 extends from a diffuser plenum 60 surrounding the combustor 52 into the combustion chamber 54. The core flowpath 34 of FIG. 1 then reverses direction (e.g., from the aft-to-forward direction to the forward-to-aft direction) a second time as the core flowpath 34 extends from the combustion chamber 54 into the turbine section 39.

During operation, air enters the gas turbine engine 22 through the inlet section 36 and its engine inlet 30. The inlet section 36 directs this air from the engine inlet 30 into the core flowpath 34 and the compressor section 37. The air within the core flowpath 34 may be referred to as core air. This core air is compressed by the compressor rotor 44 and directed through a diffuser 62 and its plenum 60 into the combustion chamber 54. Fuel is injected and mixed with the compressed core air to provide a fuel-air mixture. This fuel-air mixture is ignited within the combustion chamber 54, and combustion products thereof flow through the turbine section 39 and cause the turbine rotor 46 to rotate. The rotation of the turbine rotor 46 drives rotation of the compressor rotor 44 and, thus, compression of the air received from the engine inlet 30. The exhaust section 40 receives the combustion products from the turbine section 39. The exhaust section 40 directs the received combustion products out of the gas turbine engine 22 to provide forward engine thrust.

The static engine structure 42 of FIG. 1 includes one or more stationary structures 64 and 66 which may collectively house the rotating structure; e.g., elements 44, 46 and 48. These stationary structures 64 and 66 are configured as discrete sub-structures (e.g., axial sections) of the static engine structure 42. The forward, upstream stationary structure 64 and/or the aft, downstream stationary structure 66 may each be formed as (or part of) a monolithic body 68, 70 (e.g., a monolithic vehicle component), respectively. Herein, the term "monolithic" may describe a component of the vehicle which is formed as a single unitary body. Each stationary structure 64, 66, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

The upstream stationary structure 64 may form a section of the static engine structure 42 along any one or more or all of the engine sections 36 and 37. The upstream stationary structure 64 of FIG. 1, for example, includes an inlet nozzle 72 and at least a forward, upstream section (or an entirety) of a compressor case 74. The upstream stationary structure 64 may also include an internal support structure for at least one of the bearings 50; e.g., the forward bearing 50A.

The inlet nozzle 72 is disposed within the inlet section 36, for example, at the engine inlet 30. This inlet nozzle 72 may be configured to condition the core air entering the compressor section 37. The inlet nozzle 72 of FIG. 1, for example, includes one or more inlet guide vanes 76 configured to impart swirl to the core air. These inlet guide vanes 76 are arranged circumferentially about the axial centerline 28 in an annular array; e.g., an inlet nozzle vane array. Each of the inlet guide vanes 76 extends radially across the core flowpath 34 between and is connected to an inner platform 78 of the inlet nozzle 72 and an outer platform 80 of the inlet nozzle 72.

The compressor case 74 houses the compressor section 37 and its compressor rotor 44. The compressor case 74, for example, extends circumferentially about (e.g., circumscribes) and axially overlaps the compressor rotor 44. The compressor case 74 may thereby form an outer peripheral boundary of the core flowpath 34 within the compressor section 37.

The downstream stationary structure 66 may form a section of the static engine structure 42 along any one or more or all of the engine sections 38-40. The downstream stationary structure 66 of FIG. 1, for example, includes a diffuser nozzle 82, an outer diffuser (e.g., plenum) case 84, the combustor 52, a turbine nozzle 86, a turbine case 88 and an exhaust case 90. The downstream stationary structure 66 may also include an internal support structure for at least one of the bearings 50; e.g., the aft bearing 50B.

The diffuser nozzle 82 is disposed within the diffuser 62 upstream of the plenum 60. This diffuser nozzle 82 may be configured to condition the core air leaving the compressor section 37 and entering the plenum 60. The diffuser nozzle 82 of FIG. 1, for example, includes one or more diffuser guide vanes 92 configured to impart swirl to the core air. These diffuser guide vanes 92 are arranged circumferentially about the axial centerline 28 in an annular array; e.g., a diffuser nozzle vane array. Each of the diffuser guide vanes 92 extends radially across the core flowpath 34 between and is connected to an inner platform 94 of the diffuser nozzle 82 and an outer platform 96 of the diffuser nozzle 82.

The diffuser case 84 houses the combustor 52 within the combustor section 38. The diffuser case 84, for example, extends circumferentially about (e.g., circumscribes), axially overlaps and is spaced radially outward from the combustor 52. The diffuser case 84 may thereby form an outer peripheral boundary of the core flowpath 34 and the plenum 60 along the combustor 52. The outer platform 96 of the diffuser nozzle 82 may be formed as a forward, upstream extension of the diffuser case 84.

The combustor 52 of FIG. 1 includes an outer combustor wall 98, an inner combustor wall 100 and the bulkhead wall 58. The outer combustor wall 98 extends axially between and may be connected to an outer platform 102 of the turbine nozzle 86 and the bulkhead wall 58. The outer combustor wall 98 extends circumferentially about (e.g., circumscribes), axially overlaps and is spaced radially outward from the inner combustor wall 100. The inner combustor wall 100 extends axially between an inner platform 104 of the turbine nozzle 86 and the bulkhead wall 58, and the inner combustor wall 100 may be connected to the bulkhead wall 58. The inner combustor wall 100 extends circumferentially about (e.g., circumscribes), axially overlaps and is spaced radially outward from the turbine case 88. The bulkhead wall 58 extends radially between the outer combustor wall 98 and the inner combustor wall 100, at aft ends of the combustor walls 98 and 100. With this arrangement, the combustor walls 58, 98 and 100 collectively form peripheral boundaries of the combustion chamber 54 within the combustor 52.

The turbine nozzle 86 is disposed within the turbine section 39, for example, at an intersection between the combustor section 38 and the turbine section 39. This turbine nozzle 86 may be configured to condition the combustion products leaving the combustor section 38 and its combustion chamber 54 and entering the turbine section 39. The turbine nozzle 86 of FIG. 1, for example, includes one or more turbine guide vanes 106 configured to impart swirl to the combustion products. These turbine guide vanes 106 are arranged circumferentially about the axial centerline 28 in an annular array; e.g., a turbine nozzle vane array. Each of the turbine guide vanes 106 extends radially across the core flowpath 34 between and is connected to the inner platform 104 of the turbine nozzle 86 and the outer platform 102 of the turbine nozzle 86.

The turbine case 88 houses at least a portion of the turbine section 39 and its turbine rotor 46. The turbine case 88, for example, extends circumferentially about (e.g., circumscribes) and axially overlaps at least a (e.g., an aft, downstream) portion of the turbine rotor 46. The turbine case 88 may thereby form an outer peripheral boundary of the core flowpath 34 within at least (e.g., an aft, downstream) portion of the compressor section 37.

The exhaust case 90 extends axially between and to one or more of the engine cases 84 and 88 and the engine exhaust 32. The exhaust case 90 may also be connected to the diffuser case 84 and/or the turbine case 88 at aft ends thereof. The exhaust case 90 extends circumferentially about (e.g., completely around) the axial centerline 28. The exhaust case 90 may thereby form an outer peripheral boundary of the core flowpath 34 within the exhaust section 40 to the engine exhaust 32. However, in other embodiments, the exhaust case 90 may be formed discrete from the downstream stationary structure 66 and subsequently attached to one or more of the engine cases 84 and 88.

An aft, downstream end of the upstream stationary structure 64 is mated with and connected to a forward, upstream end of the downstream stationary structure 66. The upstream stationary structure 64 of FIG. 1, for example, is attached to the downstream stationary structure 66 by at least one mechanical joint; e.g., a bolted flange connection. However, in other embodiments, the upstream stationary structure 64 may also or alternatively be attached to the downstream stationary structure 66 by at least one bond joint; e.g., a braze connection, a welded connection, etc.

The engine actuation system 26 (e.g., the starting system) includes a fluid reservoir 108, a flow circuit 110 and a flow regulator 112. The engine actuation system 26 of FIG. 1 also includes an ignitor 114; e.g., a pyrotechnic charge, a spark plug, etc.

Figure 2:
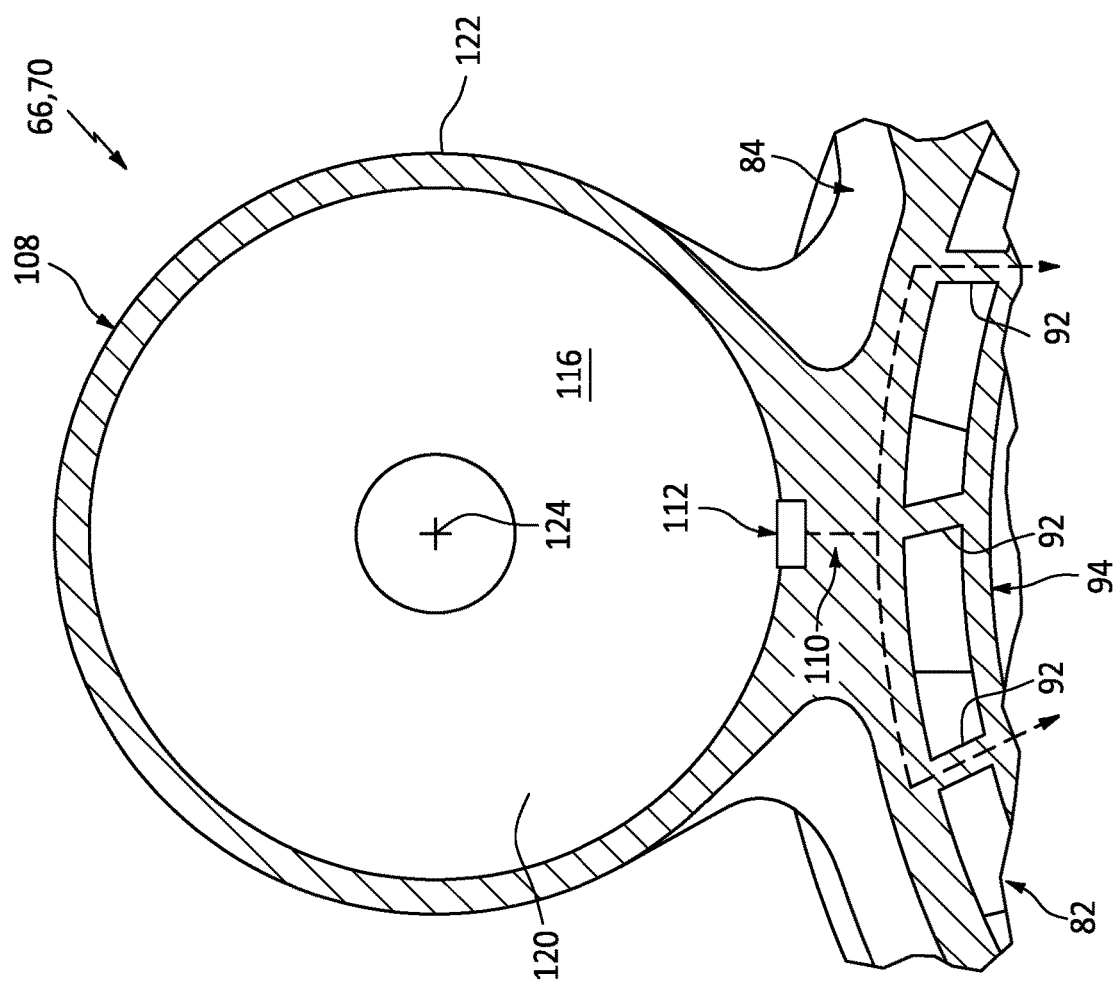
FIG. 2 is a cross-sectional illustration of a portion of a stationary structure for the engine system including a fluid reservoir with a circular geometry.
Figure 3:
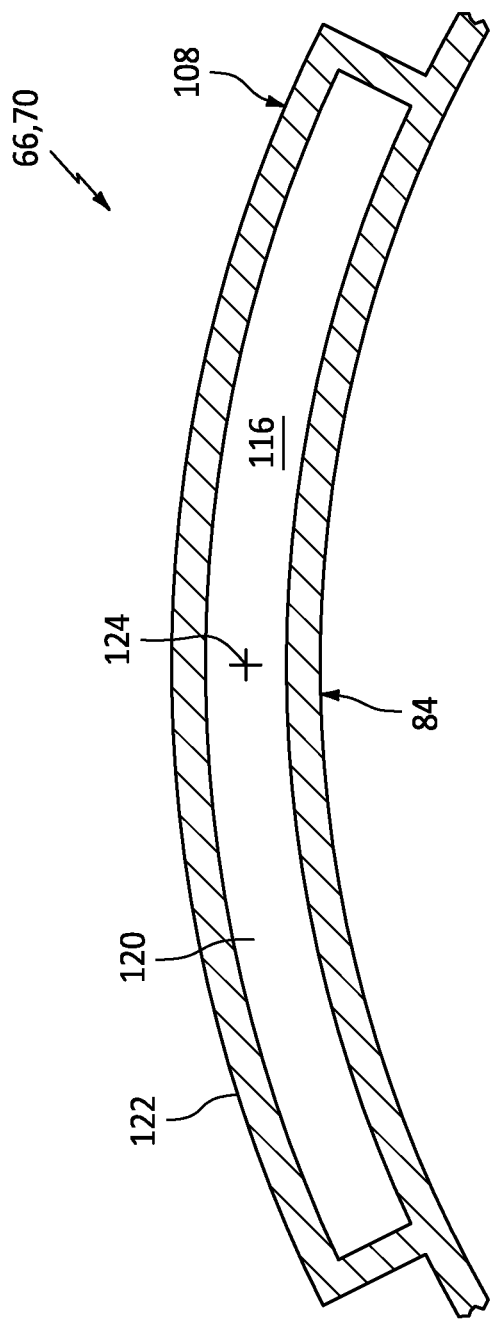
FIG. 3 is a partial cross-sectional illustration of a portion of the stationary structure including the fluid reservoir with an elongated and/or conformal geometry.

The fluid reservoir 108 is configured to contain a volume of working fluid; e.g., fuel. The fluid reservoir 108, in particular, is a sealed pressure vessel with an internal cavity 116. Examples of the pressure vessel include, but are not limited to, a tank, a bottle and a cylinder. The fluid reservoir 108 of FIG. 1 includes a first (e.g., forward) endwall 118, a second (e.g., aft) endwall 120 and a tubular sidewall 122. The reservoir sidewall 122 extends along a centerline 124 of the fluid reservoir 108 between and to the first endwall 118 and the second endwall 120, which reservoir centerline 124 may be parallel with the axial centerline 28. The reservoir sidewall 122 is connected to the first endwall 118 and the second endwall 120. Referring to FIG. 2, the reservoir sidewall 122 may have a circular (or oval) cross-sectional geometry when viewed, for example, in a reference plane perpendicular to the centerline 28, 124. Alternatively, referring to FIG. 3, the reservoir sidewall 122 may have a curved, elongated (e.g., arcuate) cross-sectional geometry such that the fluid reservoir 108 may be conformal with the static engine structure 42.

Referring to FIG. 1, the fluid reservoir 108 and its walls 118, 120 and 122 may be formed integral with at least a section of the static engine structure 42; e.g., the downstream stationary structure 66. The fluid reservoir 108, for example, may be formed as a part of the monolithic body 70. In the specific embodiment of FIG. 1, an inner portion of the reservoir sidewall 122 may be part of/also form a respective portion of the diffuser case 84; see also FIGS. 2 and 3. In other embodiments, however, the reservoir sidewall 122 may be part of/also form another portion of the downstream stationary structure 66 or, more generally, the static engine structure 42. In still other embodiments, the reservoir sidewall 122 may be separated from the diffuser case 84 (or another portion of the downstream stationary structure 66) by an integral intermediate member such as a pedestal, a pylon, a strut, etc.

The flow circuit 110 is configured to fluidly couple the flow regulator 112, and the fluid reservoir 108 through the flow regulator 112, with the core flowpath 34. The flow circuit 110 of FIG. 4, for example, includes one or more flow passages 126-128. Each of these flow passages 126, 127, 128 may be formed by and may extend into, within and/or through any one or more elements of the monolithic body 70.

Figure 4:
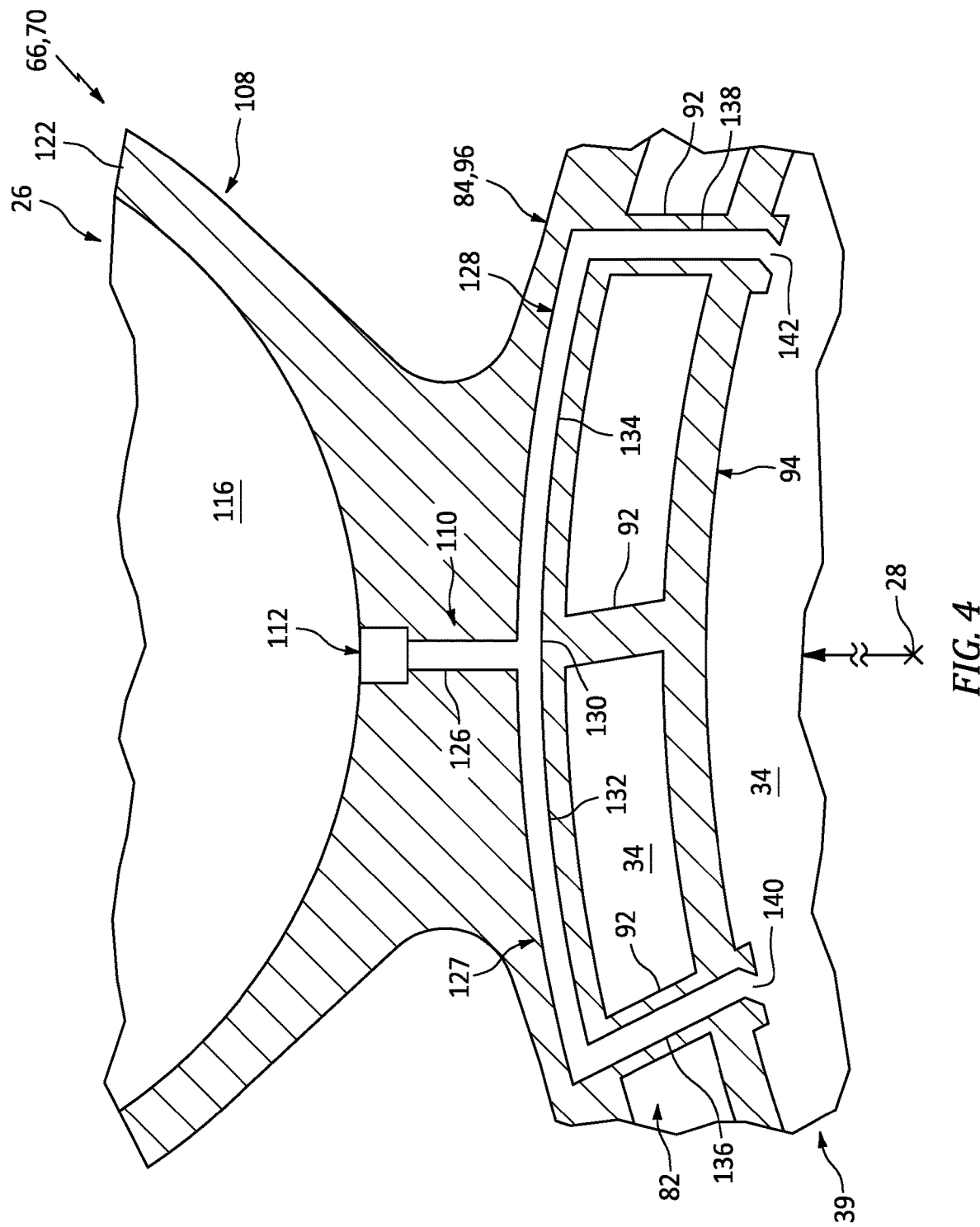
FIG. 4 is a cross-sectional illustration of a portion of the stationary structure with a flow circuit and a flow regulator (schematically shown) for coupling the fluid reservoir to a core flowpath.

The base (e.g., truck) passage 126 of FIG. 4 is formed by and is disposed within (e.g., internal to) the reservoir sidewall 122, the diffuser case 84 and/or the diffuser outer platform 96. This base passage 126 extends within the reservoir sidewall 122/the diffuser case 84/the diffuser outer platform 96 (e.g., radially inward towards the axial centerline 28) from the flow regulator 112 to an intersection 130 with the branch passages 127 and 128.

Each of the branch passages 127, 128 of FIG. 4 is formed by and is disposed within (e.g., internal to) the reservoir sidewall 122/the diffuser case 84/the diffuser outer platform 96, a respective one of the diffuser guide vanes 92 and the diffuser inner platform 94. An upstream section 132, 134 of each branch passage 127, 128, for example, may extend circumferentially (and/or axially) within the reservoir sidewall 122/the diffuser case 84/the diffuser outer platform 96 from the intersection 130 to a downstream section 136, 138 of the respective branch passage 127, 128. This downstream section 136, 138 of the branch passage 127, 128 may extend (e.g., radially inward towards the axial centerline 28) out of the diffuser case 84/the diffuser outer platform 96, through the respective diffuser guide vane 92 and the diffuser inner platform 94 to a respective circuit outlet 140, 142; e.g., an outlet from the branch passage 127, 128 into the core flowpath 34. The branch passages 127 and 128 of FIG. 4 are fluidly coupled in parallel between the base passage 126 and the core flowpath 34. The branch passages 127 and 128 may be configured with a common (e.g., the same) longitudinal length between the intersection 130 and its respective circuit outlet 140, 142. The branch passages 127 and 128 may thereby have a common pressure drop thereacross; however, the present disclosure is not limited to such an exemplary relationship.

The circuit outlets 140 and 142 of FIG. 4 are disposed to opposing circumferential sides of the base passage 126. These circuit outlets 140 and 142 may be longitudinally aligned along the core flowpath 34; e.g., the circuit outlets 140 and 142 may be axially aligned along the axial centerline 28; see also FIG. 1. The circuit outlets 140 and 142 of FIG. 4 are disposed within the turbine section 39. The circuit outlets 140 and 142, for example, may be arranged at or upstream from an upstream end of the turbine rotor 46; e.g., see FIG. 1.

Figure 6B:
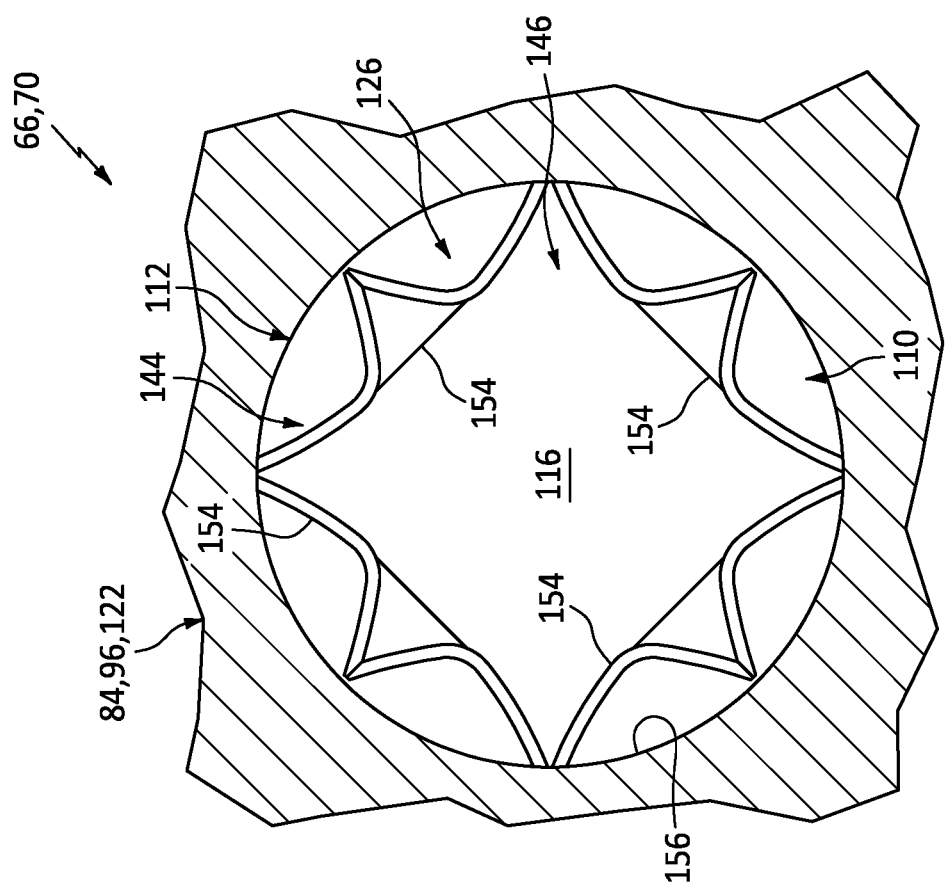
FIGS. 6A and 6B are cross-sectional illustrations of a portion of the actuation system with the flow regulator in the closed and open arrangements.

The flow regulator 112 is arranged between the fluid reservoir 108 and its reservoir cavity 116 and the flow circuit 110 and its base passage 126. The flow regulator 112 is configured to selectively fluidly couple the fluid reservoir 108 with the flow circuit 110. For example, referring to FIGS. 5A and 6A, the flow regulator 112 may fluidly decouple the fluid reservoir 108 from the flow circuit 110 during a first (e.g., closed) mode of operation; e.g., during setup and/or transportation of the aerial vehicle and its gas turbine engine 22. Referring to FIGS. 5B and 6B, the flow regulator 112 may subsequently (e.g., permanently) fluidly couple the fluid reservoir 108 to the flow circuit 110 during a second (e.g., open) mode of operation; e.g., during actuation (e.g., startup) of the gas turbine engine 22.

The flow regulator 112 may be configured as or otherwise include a burst plate; e.g., a burst disk. During the first mode of FIGS. 5A and 6A, for example, the flow regulator 112 forms a complete and intact barrier 144 (e.g., a plug) between the fluid reservoir 108 and the flow circuit 110. During the second mode of FIGS. 5B and 6B, however, the barrier 144 may break (e.g., burst open into the base passage 126) when fluid pressure within the fluid reservoir 108 increases above a threshold level to open a port 146 through which the pressurized fluid (e.g., pressurized gas) may flow from the fluid reservoir 108 into the base passage 126.

The barrier 144 may be configured to break (e.g., burst open) without liberating debris (e.g., broken off fragments of the barrier 144) into the flow circuit 110. The barrier 144 of FIGS. 5A and 6A, for example, includes a regulator wall 148 and one or more stress concentrators 150. The regulator wall 148 may be formed integral with the reservoir sidewall 122 or another portion of the monolithic body 70. This regulator wall 148 may be sized relatively thin; e.g., thinner than the reservoir sidewall 122. The stress concentrators 150 are configured to structurally weaken selects area(s) of the regulator wall 148 such that the barrier 144 breaks (e.g., bursts open) in a controlled and/or predetermined fashion. The stress concentrators 150 of FIGS. 5A and 6A, for example, are configured as grooves 152 in the regulator wall 148. Each of these grooves 152 projects partially into the regulator wall 148. Each of the grooves 152 may extend laterally within the regulator wall 148, for example, across the base passage 126. The grooves 152 may also be arranged to intersect (e.g., cross) one another to provide, for example, a crosshair configuration. With this arrangement, the barrier 144 and its wall 148 of FIGS. 5B and 6B may fracture (e.g., splay open) into a plurality of lobes 154, where each of the lobes 154 is bent towards and/or against a sidewall surface 156 of the base passage 126. The present disclosure, however, is not limited to such an exemplary burst plate configuration.

Figure 6A:
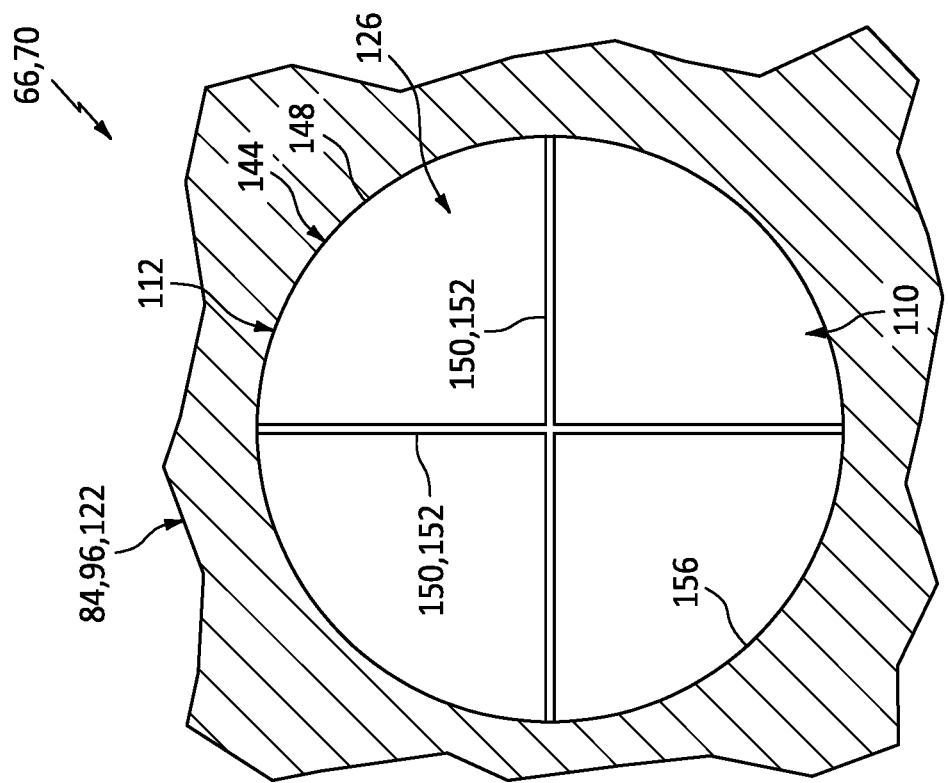

During operation of the actuation system 26 of FIGS. 1 and 4, the flow regulator 112 initially fluidly decouples the fluid reservoir 108 from the flow circuit 110; see FIGS. 5A and 6A. However, when the gas turbine engine 22 is to be started (e.g., with adverse environment conditions such as at high altitudes), the ignitor 114 may be activated (e.g., exploded) to ignite the fuel within the fluid reservoir 108 to provide relatively high pressure gas. When the pressure of the gas within the fluid reservoir 108 exceeds the threshold level pressure of the barrier 144, the barrier 144 may break (e.g., burst open) and thereby fluidly couple the fluid reservoir 108 with the flow circuit 110; see FIGS. 5B and 6B. The pressurized gas within the fluid reservoir 108 may subsequently flow out of the fluid reservoir 108, through the flow circuit 110 and its passages 126-128, and into the core flowpath 34. Within the core flowpath 34, the pressurized gas may drive rotation of the turbine rotor 46, which drives rotation of the compressor rotor 44 and facilitates a normal combustion process within the combustor 52.

Integrating the fluid reservoir 108, the flow circuit 110 and/or the flow regulator 112 into the monolithic body 70 may facilitate reduction in size, complexity and cost of the engine system 22. Furthermore, providing the flow regulator 112 with the barrier 144 configured as a burst plate may also simplify engine actuation. The flow regulator 112 therefore may not be susceptible to the same types of malfunctions as an electrically, hydraulically or pneumatically actuated valve. The present disclosure, however, is not limited to flow regulators with burst plates.

Each monolithic body 68, 70 may be additively manufactured using an additive manufacturing apparatus. Examples of the additive manufacturing apparatus include, but are not limited to, an energy (e.g., laser or electron) beam powder bed fusion (PBF) apparatus, a stereolithography (SLA) apparatus, a direct selective laser sintering (DSLS) apparatus, an electron beam sintering (EBS) apparatus, an electron beam melting (EBM) apparatus, a laser engineered net shaping (LENS) apparatus, a laser net shape manufacturing (LNSM) apparatus, a direct metal deposition (DMD) apparatus, a direct metal laser sintering (DMLS) apparatus or any other type of additive manufacturing apparatus. However, while the monolithic body 68, 70 may be formed using the additive manufacturing apparatus, the monolithic body 68, 70 may also or alternatively be formed using one or more other manufacturing processes.

The gas turbine engine 22 is described above as a single spool, radial-flow turbojet gas turbine engine for ease of description. The present disclosure, however, is not limited to such an exemplary gas turbine engine. The gas turbine engine 22, for example, may alternatively be configured as an axial flow gas turbine engine. The gas turbine engine 22 may be configured as a direct drive gas turbine engine. The gas turbine engine 22 may alternatively include a gear train that connects one or more rotors together such that the rotors rotate at different speeds. The gas turbine engine 22 may be configured with a single spool (e.g., see FIG. 1), two spools, or with more than two spools. The gas turbine engine 22 may be configured as a turbofan engine, a turbojet engine, a turboprop engine, a turboshaft engine, a propfan engine, a pusher fan engine or any other type of turbine engine. In addition, while the gas turbine engine 22 is described above with an exemplary reverse flow annular combustor, the gas turbine engine 22 may also or alternatively include any other type/configuration of annular, tubular (e.g., CAN), axial flow and/or reverse flow combustor. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine system, comprising:
a gas turbine engine including a compressor section, a combustor section, a turbine section and a flowpath extending sequentially through the compressor section, the combustor section and the turbine section, the compressor section comprising a compressor rotor, and the turbine section comprising a turbine rotor configured to drive rotation of the compressor rotor;
an actuation system including a fluid reservoir, a flow regulator and a flow circuit, the flow regulator comprising a barrier between the fluid reservoir and the flow circuit, the flow regulator configured to fluidly decouple the fluid reservoir from the flow circuit when the barrier is intact, the flow regulator configured to fluidly couple the fluid reservoir with the flow circuit when the barrier breaks, and the flow circuit configured to direct gas from the fluid reservoir into the flowpath when the barrier breaks, wherein the barrier is integral with a wall of the fluid reservoir, and the barrier comprises a wall with a stress concentrator; and
an ignitor configured to explode to ignite fuel within the fluid reservoir to provide the gas.

2. The engine system of claim 1, wherein, when the barrier breaks, the barrier is configured to burst open without liberating debris into the flow circuit.

3. The engine system of claim 1, wherein the stress concentrator comprises a groove.

4. The engine system of claim 3, wherein the wall further includes a second stress concentrator that intersects the stress concentrator.

5. The engine system of claim 1, wherein the flow circuit is configured to direct the gas into the flowpath within the turbine section when the barrier breaks.

6. The engine system of claim 1, wherein the flow circuit is configured to direct the gas into the flowpath to drive rotation of the turbine rotor when the barrier breaks.

7. The engine system of claim 1, wherein the flow circuit includes
a base passage;
a first branch passage extending out from the base passage to a first outlet along the flowpath; and
a second branch passage extending out from the base passage to a second outlet along the flowpath.

8. The engine system of claim 7, wherein a length of the first branch passage is equal to a length of the second branch passage.

9. The engine system of claim 7, wherein the first outlet and the second outlet are aligned longitudinally along the flowpath.

10. The engine system of claim 1, wherein
the gas turbine engine further includes a plurality of vanes arranged in an array and extending across the flowpath; and
the flow circuit extends through a first of the plurality of vanes.

11. The engine system of claim 1, wherein
the gas turbine engine further includes a wall forming a peripheral boundary of the flowpath; and
the flow circuit extends circumferentially about a centerline of the gas turbine engine within the wall.

12. The engine system of claim 1, wherein
the gas turbine engine comprises a stationary structure and a rotating structure at least partially housed within the stationary structure;
the fluid reservoir and the stationary structure are included in a monolithic body; and
the rotating structure includes the compressor rotor and the turbine rotor.

13. The engine system of claim 12, wherein the flow circuit comprises a passage formed by and within the monolithic body.

14. An engine system, comprising:
a gas turbine engine;
a fluid reservoir for the gas turbine engine;
a burst plate integral with a sidewall of the fluid reservoir, the burst plate comprising a passage barrier with one or more stress concentrators; and
an ignitor configured to explode to ignite fuel within the fluid reservoir.

* * * * *